(12) United States Patent
Tanavde et al.

(10) Patent No.: US 7,936,103 B2
(45) Date of Patent: May 3, 2011

(54) METHODS FOR FABRICATING A WEDGE SYSTEM FOR AN ELECTRIC MACHINE

(75) Inventors: Anand Shankar Tanavde, Slingerlands, NY (US); Lakshminarayana Kanakamedala, Glenville, NY (US)

(73) Assignee: General Electric Company, Schenectady, NY (US)

( * ) Notice: Subject to any disclaimer, the term of this patent is extended or adjusted under 35 U.S.C. 154(b) by 298 days.

(21) Appl. No.: 11/944,216

(22) Filed: Nov. 21, 2007

(65) Prior Publication Data

US 2009/0127967 A1    May 21, 2009

(51) Int. Cl.
*H02K 3/48* (2006.01)
(52) U.S. Cl. ........................................................ 310/214
(58) Field of Classification Search ............... 310/214, 310/216.125, 216.126, 216.082, 216.086
See application file for complete search history.

(56) References Cited

U.S. PATENT DOCUMENTS

| | | | |
|---|---|---|---|
| 1,271,409 A * | 7/1918 | Wynne ........................... | 310/214 |
| 2,819,514 A | 1/1958 | Polard et al. | |
| 3,391,294 A | 7/1968 | Moxie et al. | |
| 3,735,169 A | 5/1973 | Balke et al. | |
| 3,739,212 A | 6/1973 | Koelbel et al. | |
| 3,949,255 A * | 4/1976 | Brown et al. .................. | 310/214 |
| 4,163,166 A | 7/1979 | Kamiya et al. | |
| 4,716,648 A | 1/1988 | Nel | |
| 4,761,581 A * | 8/1988 | Watanabe et al. ............. | 310/214 |
| 4,864,171 A | 9/1989 | Khutoretsky et al. | |
| 4,901,572 A | 2/1990 | Suyama | |
| 4,922,147 A * | 5/1990 | Sismour et al. ................. | 310/61 |
| 5,428,257 A * | 6/1995 | Lurkens ........................ | 310/168 |
| 5,698,924 A * | 12/1997 | Nishida ........................ | 310/214 |
| 5,866,966 A | 2/1999 | Fulton | |
| 6,208,059 B1 * | 3/2001 | Cooper ......................... | 310/214 |
| 6,774,522 B2 | 8/2004 | Aoyama et al. | |
| 6,791,230 B2 * | 9/2004 | Tornquist et al. ............. | 310/214 |
| 6,882,079 B2 * | 4/2005 | Kilpatrick et al. ............ | 310/214 |
| 6,933,648 B2 | 8/2005 | Buchan et al. | |
| 7,034,509 B2 * | 4/2006 | Kusko ............................ | 322/90 |

* cited by examiner

*Primary Examiner* — Nguyen N Hanh
(74) *Attorney, Agent, or Firm* — Armstrong Teasdale LLP

(57) ABSTRACT

A method for assembling an electric machine is provided. The method includes providing a rotor having a cavity formed therein. At least one contoured recess is formed in a portion of the cavity. A wedge is inserted into the cavity. The wedge includes at least one contoured protrusion that is configured to mirror the at least one contoured recess of the cavity. The wedge is inserted such that the at least one contoured protrusion is positioned within the at least one contoured recess to facilitate positioning the wedge within the cavity. The at least one contoured protrusion and the at least one contoured recess are shaped to facilitate minimizing stresses within the rotor and the wedge.

14 Claims, 4 Drawing Sheets

METHODS FOR FABRICATING A WEDGE SYSTEM FOR AN ELECTRIC MACHINE

BACKGROUND OF THE INVENTION

This invention relates generally to electric machines, and more specifically, to methods for fabricating a wedge system that may be used with electric machines.

Generally, known electric machines use a rotor that includes at least one conducting coil retained therein. Known conducting coils are typically retained within a cavity formed within the rotor. As the rotor rotates, the conductor coil conducts an electric current that operates the machine. At least some known, rotors include a wedge that is positioned within the cavity to retain the conductor coil in position. Because the wedge is in the cavity, the wedge is subjected to centrifugal forces due to coil and wedge inertia as the rotor rotates. As the wedge is held in the cavity the centrifugal forces are transferred to the rotor. Over time, the wedge and the rotor will be subjected to cyclic loading due to starting and stopping of the machine. This may cause fatigue failure of the wedge and/or the rotor, thereby causing the conductor coil to become displaced from the cavity.

To prevent the conductor coil from becoming displaced, at least some known wedges are fabricated from a material that has an increased weight in comparison to the coil. However, the added weight may reduce the overall performance of the machine. Moreover, at least some rotors are designed with fewer and/or smaller conductor coils positioned within the cavity. The combination of the added weight and the reduced coil size may also result in a reduction of the machine's performance. To compensate for the decreased performance, at least some machines are fabricated with an increased length to maintain machine efficiency. As a result, costs, fabrication time, and/or maintenance associated with the machine may be increased. In addition, applicable uses for the machine may also be limited due to the machine's size.

BRIEF DESCRIPTION OF THE INVENTION

In one aspect, a method for assembling an electric machine is provided. The method includes providing a rotor having a cavity formed therein. At least one contoured recess is formed in a portion of the cavity. A wedge is inserted into the cavity. The wedge includes at least one contoured protrusion that is configured to mirror the at least one contoured recess of the cavity. The wedge is inserted such that the at least one contoured protrusion is positioned within the at least one contoured recess to facilitate positioning the wedge within the cavity. The at least one contoured protrusion and the at least one contoured recess are shaped to facilitate minimizing stresses within the rotor and the wedge.

In another aspect, a rotor for an electric machine is provided. The rotor includes a cavity having at least one contoured recess formed in a portion of thereof. The rotor also includes a wedge including at least one contoured protrusion that is configured to mirror the at least one contoured recess of the cavity and is configured to position within the at least one contoured recess to facilitate positioning the wedge within the cavity. The at least one contoured recess and the at least one contoured protrusion are shaped to facilitate minimizing stresses within the rotor.

In yet another aspect, an electric machine is provided. The electric machine includes a rotor and a cavity formed in the rotor and configured to retain at least one electrical coil therein. At least one contoured recess is formed in a portion of the cavity. The electric machine also includes a wedge including at least one contoured protrusion that is configured to mirror the at least one contoured recess of the cavity and is configured to position within the at least one contoured recess to facilitate positioning the wedge within the cavity. The at least one contoured recess and the at least one contoured protrusion are shaped to facilitate minimizing stresses within the rotor and the wedge.

DETAILED DESCRIPTION OF THE INVENTION

The present invention provides a wedge system that facilitates retaining an electrical coil within an electric machine. The system includes a cavity defined in a rotor of the machine and a wedge that is positioned within the cavity to facilitate retaining the coil therein. In the exemplary embodiment, the wedge facilitates uniformly distributing centrifugal loading induced to the coil during rotor rotation, retaining the coil within the cavity during rotor rotation, and/or reducing an overall weight of the rotor. In the exemplary embodiment, the wedge includes at least one cooling channel defined therein.

It should be noted that although the present invention is described with respect to wedge systems, one of ordinary skill in the art should understand that the present invention is not limited to being used only with wedge systems. Rather, the present invention may be used with any system configured to retain a coil and/or other material in a desired position. Further, for simplicity, the present invention is described herein only with respect to electric machines. However, as would be appreciated by one of ordinary skill in the art, the present invention is not limited to electric machines, but rather, the present invention may be used with any machine that retains a coil and/or other material in a desired position.

Figure 1:
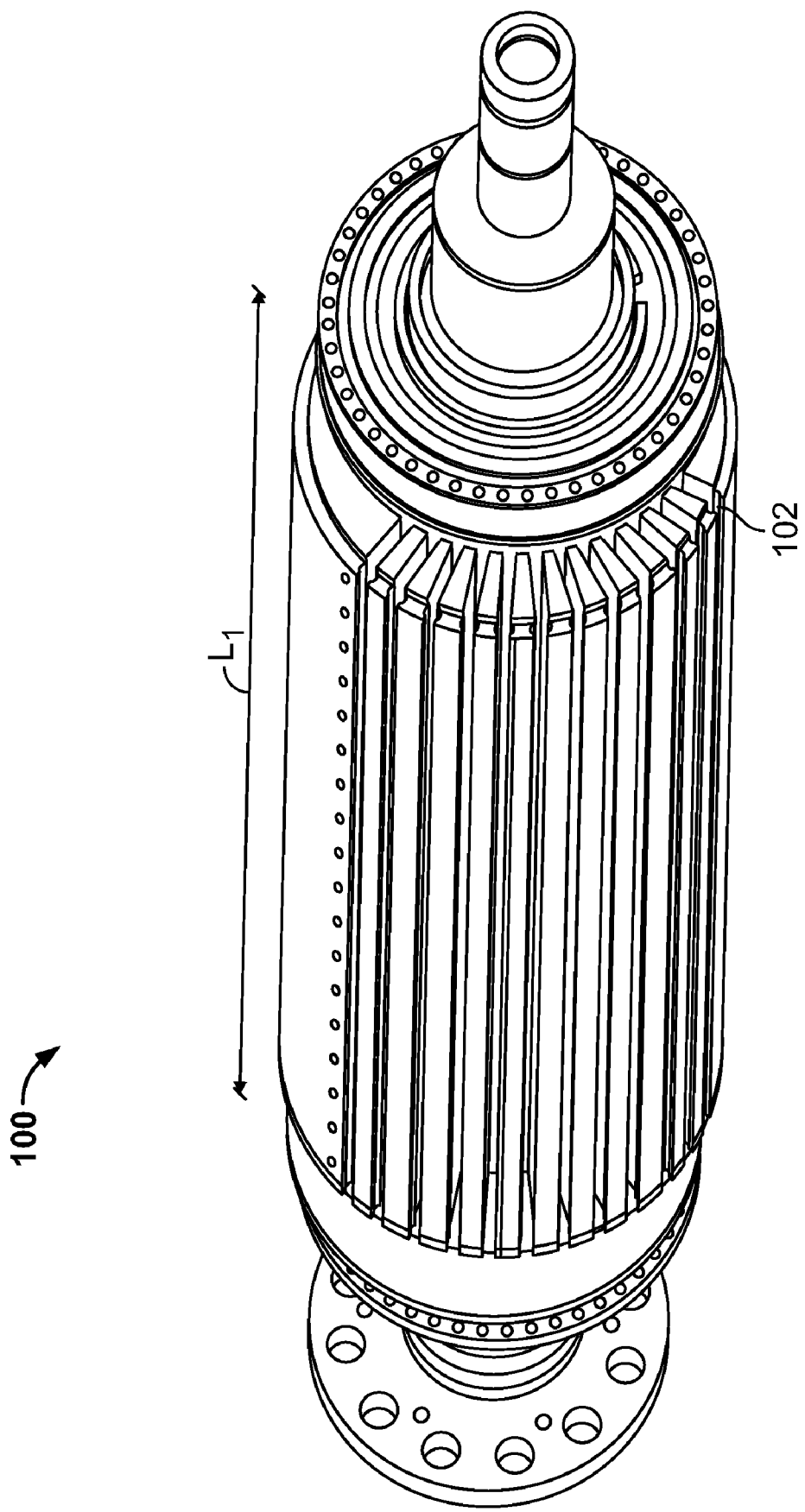
FIG. 1 is a perspective view of an exemplary rotor that may be used with an electric machine.

FIG. 1 is a perspective view of an exemplary rotor 100 that may be used with an electric machine (not shown). In the exemplary embodiment, rotor 100 includes a plurality of cavities 102 define therein that are configured to retain an electrical coil (not shown in FIG. 1) such as, for example, a copper conductor. In the exemplary embodiment, the electrical coil is used to create an electrical field when rotor 100 rotates. Specifically, by rotating rotor 100 within a stator (not shown) of the electric machine, the coil enables the electric machine to generate an electric current. In the exemplary embodiment, cavities 102 extend substantially axially along a length $L_1$ of rotor 100.

Figure 2:
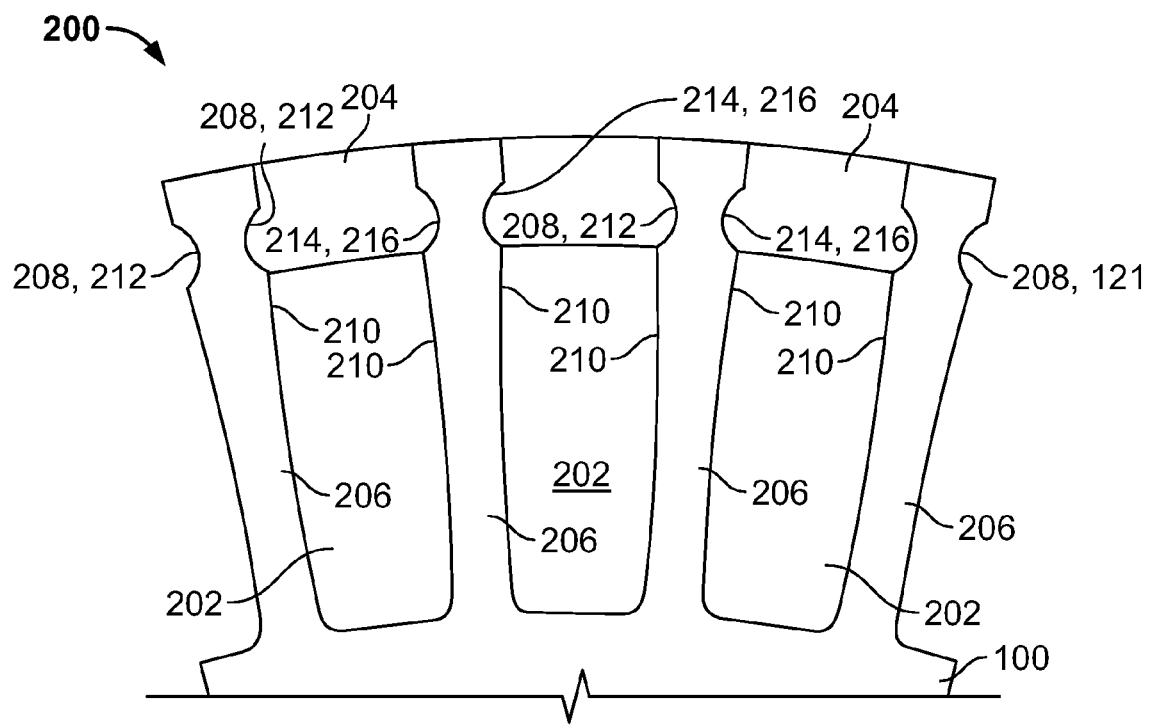
FIG. 2 is a cross-sectional view of an exemplary wedge system that may be used with rotor shown in FIG. 1.

FIG. 2 is a cross-sectional view of an exemplary wedge system 200 that may be used with rotor 100 (shown in FIG. 1). In the exemplary embodiment, wedge system 200 includes a contoured cavity 202 and a contoured wedge 204. Each contoured cavity 202 is defined between circumferentially adjacent rotor dovetail teeth 206 and extends substantially axially along the length $L_1$ of rotor 100. Each contoured cavity 202 includes at least one recess 208 defined in a wall 210 of the cavity 202. Specifically, each cavity 202 includes a pair of recesses 208. More specifically, a recess 208 is formed within each wall 210 defining cavity 202. In the exemplary embodiment, each recess 208 includes a contoured or curved edge 212. Further, in the exemplary embodiment, each recess 208 extends generally axially along rotor length $L_1$ (shown in FIG. 1).

In the exemplary embodiment, wedge 204 is formed by at least one protrusion 214. In the exemplary embodiment, protrusion 214 is formed by a contoured or curved edge 216. Specifically, in the exemplary embodiment, edge 216 is contoured with a shape that substantially mirrors the shape of the contoured recess 208 within cavity 202. Each protrusion 214 is also sized and shaped to be received within a contoured recess 208 in a close fit that facilitates aligning wedge 204 and maintaining an orientation of wedge 204 within cavity 202. In the exemplary embodiment, each wedge 204 is formed with a pair of protrusions 214 that facilitate positioning each wedge 204 within each recess 208 axially through cavity 202 for the length $L_1$ of rotor 100. Specifically, in the exemplary embodiment, each protrusion 214 extends axially through each recess 208 for rotor length $L_1$. The wedge 204 is either a single continuous piece or segmented pieces of different or same lengths spanning over length $L_1$.

Figure 3:
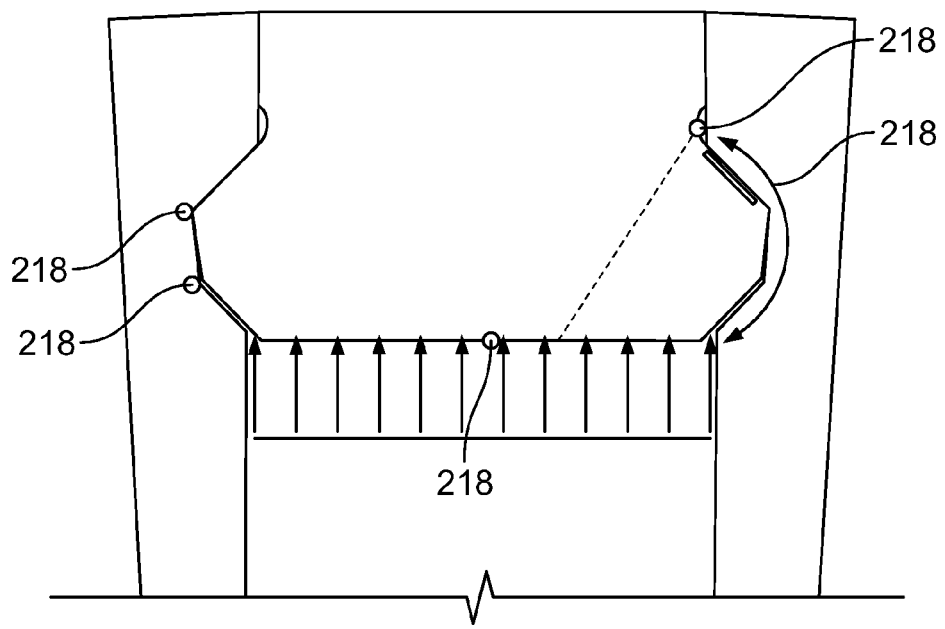
FIG. 3 is a cross-sectional view of an exemplary known wedge and illustrates a plurality of locations where stresses in the known wedge may be reduced using the wedge system shown in FIG. 2.
Figure 4:
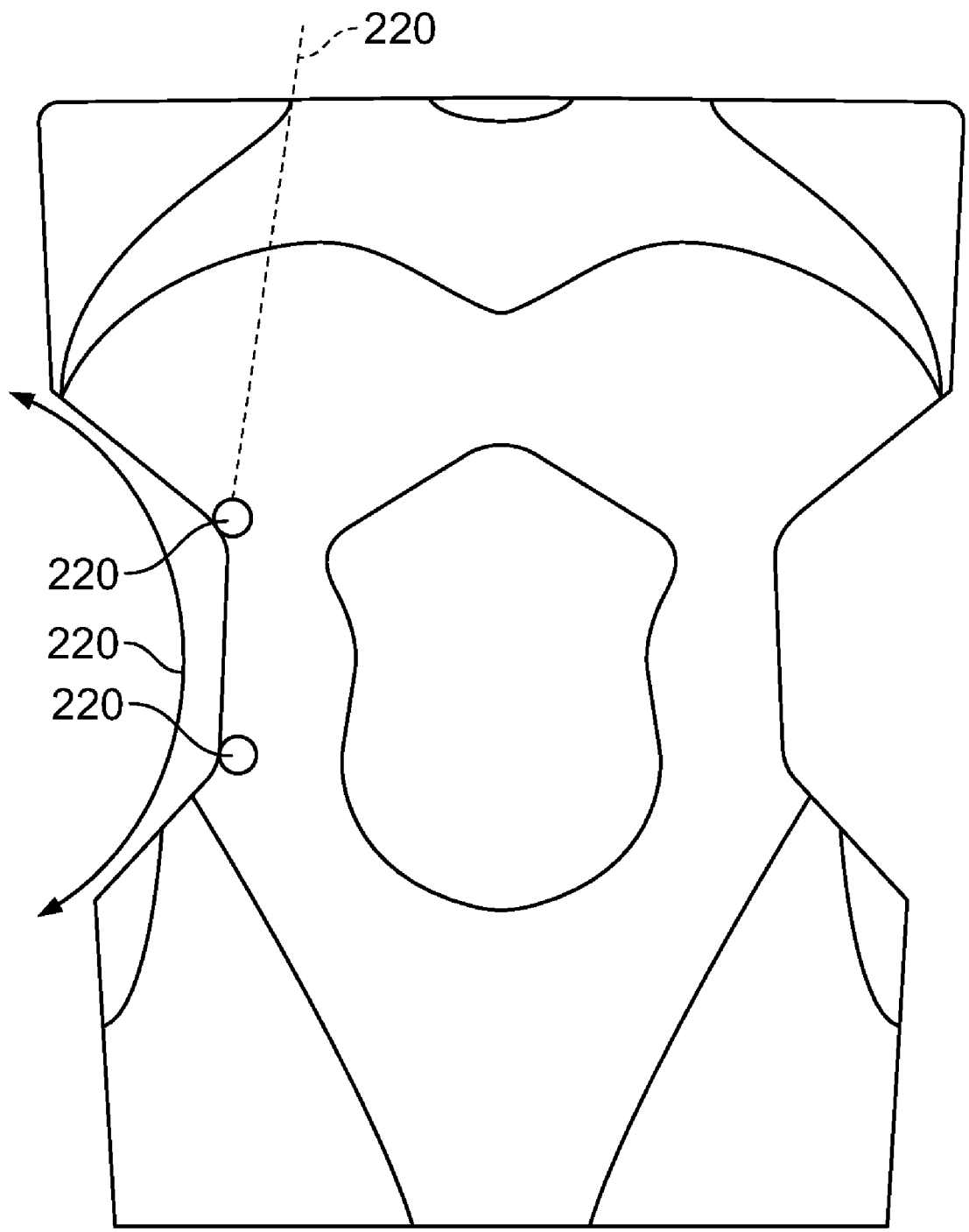
FIG. 4 is a cross-sectional view of an exemplary known cavity wall and illustrates a plurality of locations where stresses in the known cavity wall may be reduced using the wedge system shown in FIG. 2.

FIG. 3 is a cross-sectional view of a known wedge and a plurality of points 218 where stresses in the known wedge are minimized using wedge system 200 (shown in FIG. 2). Further, FIG. 4 is a cross-sectional view of a known cavity wall and a plurality of points 220 where stresses in the known cavity wall are minimized using wedge system 200 (shown in FIG. 2). During operation of the electric machine, recess 208 and protrusion 214 cooperate to facilitate reducing stresses within the cavity walls 210 and wedge 204. Specifically, the contoured edges 212 and 216 of recess 208 and protrusion 214, respectively, are each shaped to facilitate reducing stresses that may result from centrifugal loads during the rotation of rotor 100. More specifically, the shape of wedge 204 facilitates uniformly distributing centrifugal loading of the electrical coil while rotor 100 rotates, and facilitates ensuring that wedge 204 retains the coil within cavity 202. In the exemplary embodiment, the uniform distribution of loading facilitates cavity 202 retaining larger electrical coils and/or more coils the rotor cavities of known electrical machines. Accordingly, the uniform distribution of loading facilitates increasing a rating of the electric machine. Moreover, the uniform loading distribution facilitates increasing a useful life and a cycle life of both wedge 204 and rotor 100.

Moreover, in the exemplary embodiment, the reduced stress concentration between contoured edges 212 and 216 enables both rotor 100 and wedge 204 to be fabricated from lighter weight materials than are commonly used with rotors and wedges. As such, the electric machine can be fabricated from lighter weight and/or cheaper materials than known electric machines and, therefore, may operate with a higher performance than known electric machines. In addition, the optimized contours of edges 212 and 216 enable wedge 204 to slide into cavity 202 and thus facilitate easier removal and assembly of wedge 204. As such, wedge 204 facilitates reducing costs associated with fabricating, maintaining, and/or repairing rotor 100.

Figure 5:
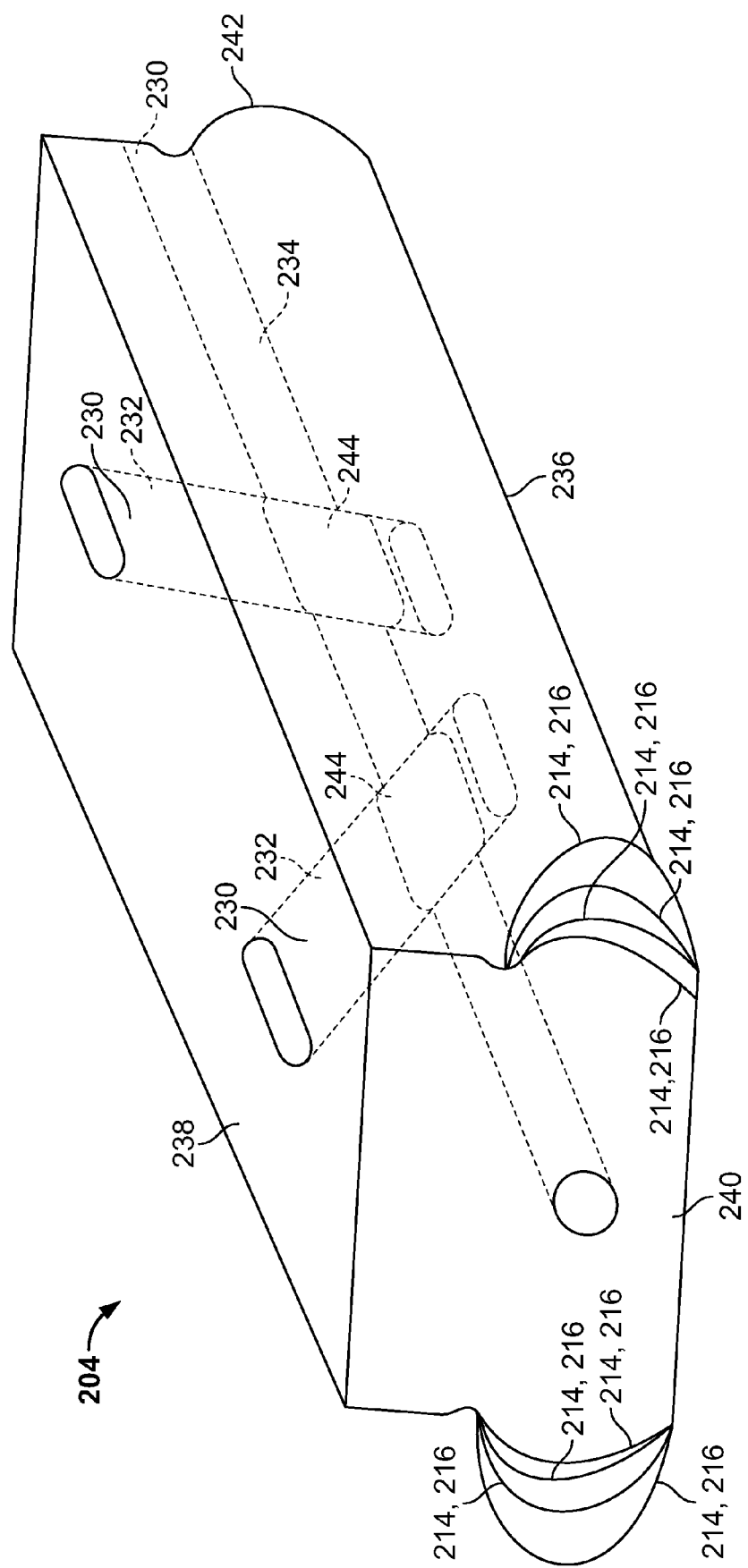
FIG. 5 is a schematic view of a wedge used in the wedge system shown in FIG. 2.

FIG. 5 is a schematic view of wedge 204. Specifically, FIG. 2 illustrates various embodiments of contoured protrusion 214 and a plurality of cooling channels 230 formed within wedge 204, and FIG. 5 illustrates various embodiments of contoured edges 216. Each embodiment illustrated accommodate a different amount of stress on the contoured edges 216 and 212 (shown in FIG. 2) of protrusion 214 and recess 208 (shown in FIG. 2), respectively. In particular, the shape of contoured edge 216 is determined based on the intended use of the electric machine.

In the exemplary embodiment, the plurality of cooling channels 230 include at least one radial cooling channel 232 and at least one axial cooling channel 234. More specifically, in the exemplary embodiment, each radial cooling channel 232 extends from a radially inner surface 236 of wedge 204 to a radially outer surface 238 of wedge 204. Moreover, each axial cooling channel 234 extends from a first axial end 240 of wedge 204 to a second axial end 242 of wedge 204. More specifically, in the exemplary embodiment, each axial cooling channel 234 extends the full length $L_1$ (shown in FIG. 1) of rotor 100 (shown in FIG. 1). The number and orientation of cooling channels 230 is variably selected based on the intended use of the electric machine. Further, in the exemplary embodiment, at least two of the cooling channels 230 intersect at interconnected holes 244 to facilitate circulating cooling fluid between the various cooling channels 230. The size and location of interconnected holes 244 are optimized to facilitate maximizing a cooling effect within wedge 204 and/or cavity 202 (shown in FIG. 2).

During operation of the electric machine, cooling fluid flows through cooling channels 230 to provide cooling fluid to the at least one coil positioned within cavity 202 (shown in FIG. 2). The cooling fluid facilitates maintaining an ideal temperature within wedge 204 and rotor 100. Accordingly, the cooling channels 230 facilitate preventing the coil, wedge 204, and/or rotor 100 (shown in FIG. 1) from overheating during operation of the electric machine.

In one embodiment, a method is provided for assembling an electric machine. The method includes providing a rotor having a cavity formed therein. At least one contoured recess is formed in a portion of the cavity. A wedge is inserted into the cavity. The wedge includes at least one contoured protrusion that is configured to mirror the contoured recess of the cavity. The wedge is inserted such that the contoured protrusion is positioned within the contoured recess to facilitate positioning the wedge within the cavity. The contoured protrusion and the contoured recess are shaped to facilitate minimizing stresses within the rotor and the wedge. In the exemplary embodiment, the cavity is configured to retain at least one electric coil. The wedge facilitates uniformly distributing a centrifugal load of the electric coil while the rotor rotates. The wedge also facilitates retaining the electric coil within the cavity while the rotor rotates. Further, in one embodiment, the wedge facilitates reducing a weight of the rotor. Moreover, in one embodiment, the wedge includes at least one cooling channel formed therein. In an exemplary embodiment, the at least one cooling channel includes at least one radial cooling channel and at least one axial cooling channel.

The above-described systems and methods facilitate maximizing centrifugal load carrying capability and a more efficient usage of rotor and wedge material within an electric machine. Specifically, the wedge system described herein facilitates substantially uniformly transferring the centrifugal loading induced by the rotor rotation through contoured cavity walls and wedge protrusions. The wedge system also facilitates optimizing the amount of contact between the wedge and the rotor such that stress concentrations between the rotor and the wedge are facilitated to be reduced. Accordingly, the above-described system and methods facilitate retaining the coils of an electric machine in position when the coils are subject to centrifugal loads induced by the rotating rotor. Further, the contoured edges of the cavity wall and the protrusions also facilitate improving the assembly and disassembly of the wedge system. Moreover, the interconnected axial and radial cooling channels of the wedge facilitate providing improved cooling of the rotor, wedge, and/or coil.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Exemplary embodiments of systems and methods for fabricating a wedge system that may be used with an electric machine are described above in detail. The systems and methods illustrated are not limited to the specific embodiments described herein, but rather, components of the system may be utilized independently and separately from other components described herein. Further, steps described in the method may be utilized independently and separately from other steps described herein.

While the invention has been described in terms of various specific embodiments, it will be recognized that the invention can be practiced with modification within the spirit and scope of the claims.

What is claimed is:

1. A method for assembling an electric machine, said method comprising:
   providing a rotor having a cavity formed therein, wherein at least one contoured recess is defined in a first portion of the cavity by a contoured wall, wherein the contoured portion of the cavity radially inward from a second portion of the cavity defined by a non-contoured wall extending from an outer surface of the rotor to the contoured wall; and
   inserting a wedge into the cavity, wherein the wedge includes an axial cooling channel and a radial cooling channel that intersects the axial cooling channel to define a cooling fluid circulation chamber, wherein the wedge also includes at least one contoured protrusion and at least one non-contoured portion that is shaped to substantially mirror the at least one contoured recess of the cavity and the at least one non-contoured wall of the cavity, respectively, wherein the at least one non-contoured portion extends from a radially outer surface of the wedge to the at least one contoured protrusion, and wherein the at least one contoured protrusion extends arcuately from the at least one non-contoured portion to a radially inner surface of the wedge, the wedge inserted such that the at least one contoured protrusion is positioned within the at least one contoured recess and such that the at least one non-contoured portion is positioned along the at least one non-contoured wall to facilitate positioning the wedge within the cavity, the at least one contoured protrusion and the at least one contoured recess shaped to facilitate minimizing stresses within the rotor and the wedge.

2. A method in accordance with claim 1 wherein providing a rotor having a cavity formed therein further comprises providing a rotor having a cavity that is configured to retain at least one electrical coil.

3. A method in accordance with claim 2 wherein inserting a wedge further comprises inserting a wedge that facilitates uniformly distributing a centrifugal load of the at least one electrical coil while the rotor rotates.

4. A method in accordance with claim 2 wherein inserting a wedge further comprises inserting a wedge that facilitates retaining the at least one electrical coil within the cavity while the rotor rotates.

5. A method in accordance with claim 1 wherein inserting a wedge further comprises inserting a wedge that facilitates reducing a weight of the rotor.

6. A rotor for an electric machine, said rotor comprising:
   a cavity having at least one contoured recess portion defined by a contoured wall and formed in a first portion of thereof, and a non-contoured recess portion formed in a second portion thereof and defined by at least one non-contoured wall that extends from the contoured wall to an outer surface of the rotor; and
   a wedge comprising an axial cooling channel and a radial cooling channel that intersects said axial cooling channel to define a cooling fluid circulation chamber, wherein said wedge further comprises at least one contoured protrusion and at least one non-contoured wedge portion shaped to substantially mirror said at least one contoured recess of said cavity and said non-contoured wall of said cavity when said wedge is at least partially inserted into said cavity, wherein said at least one non-contoured portion extends from a radially outer surface of said wedge to said at least one contoured protrusion, and wherein said at least one contoured protrusion extends arcuately from said at least one non-contoured portion to a radially inner surface of said wedge, said at least one contoured recess and said at least one contoured protrusion shaped to facilitate minimizing stresses within said rotor.

7. A rotor in accordance with claim 6 wherein said cavity is configured to retain at least one electrical coil.

8. A rotor in accordance with claim 7 wherein said wedge facilitates uniformly distributing a centrifugal load of said at least one electrical coil while said rotor rotates.

9. A rotor in accordance with claim 7 wherein said wedge facilitates retaining said at least one electrical coil within said cavity while said rotor rotates.

10. A rotor in accordance with claim 6 wherein said wedge facilitates reducing a weight of said rotor.

11. An electric machine comprising:
    a rotor;
    a cavity formed in said rotor and configured to retain at least one electrical coil therein;
    at least one contoured recess formed in a first portion of said cavity and defined by a contoured wall and at least one non-contoured portion formed in a second portion of said cavity and defined by a non-contoured wall that extends from the contoured wall to an outer surface of the rotor; and
    a wedge comprising an axial cooling channel and a radial cooling channel that intersects said axial cooling channel to define a cooling fluid circulation chamber, wherein said wedge further comprises at least one contoured protrusion and at least one non-contoured wedge portion shaped to substantially mirror said at least one contoured recess and said at least one non-contoured wall of said cavity when said wedge is at least partially inserted into said cavity, wherein said at least one non-contoured portion extends from a radially outer surface of said wedge to said at least one contoured protrusion, and wherein said at least one contoured protrusion extends arcuately from said at least one non-contoured portion to a radially inner surface of said wedge, said at least one contoured recess and said at least one contoured protrusion shaped to facilitate minimizing stresses within said rotor and said wedge.

12. An electric machine in accordance with claim 11 wherein said wedge facilitates uniformly distributing a centrifugal load of said at least one electrical coil while said rotor rotates.

13. An electric machine in accordance with claim 11 wherein said wedge facilitates retaining said at least one electrical coil within said cavity while said rotor rotates.

14. An electric machine in accordance with claim 11 wherein said wedge facilitates reducing a weight of the rotor.

* * * * *